April 8, 1958 H. E. DARLING 2,830,242
SERVO SYSTEM MEASURING APPARATUS
Filed Jan. 6, 1955
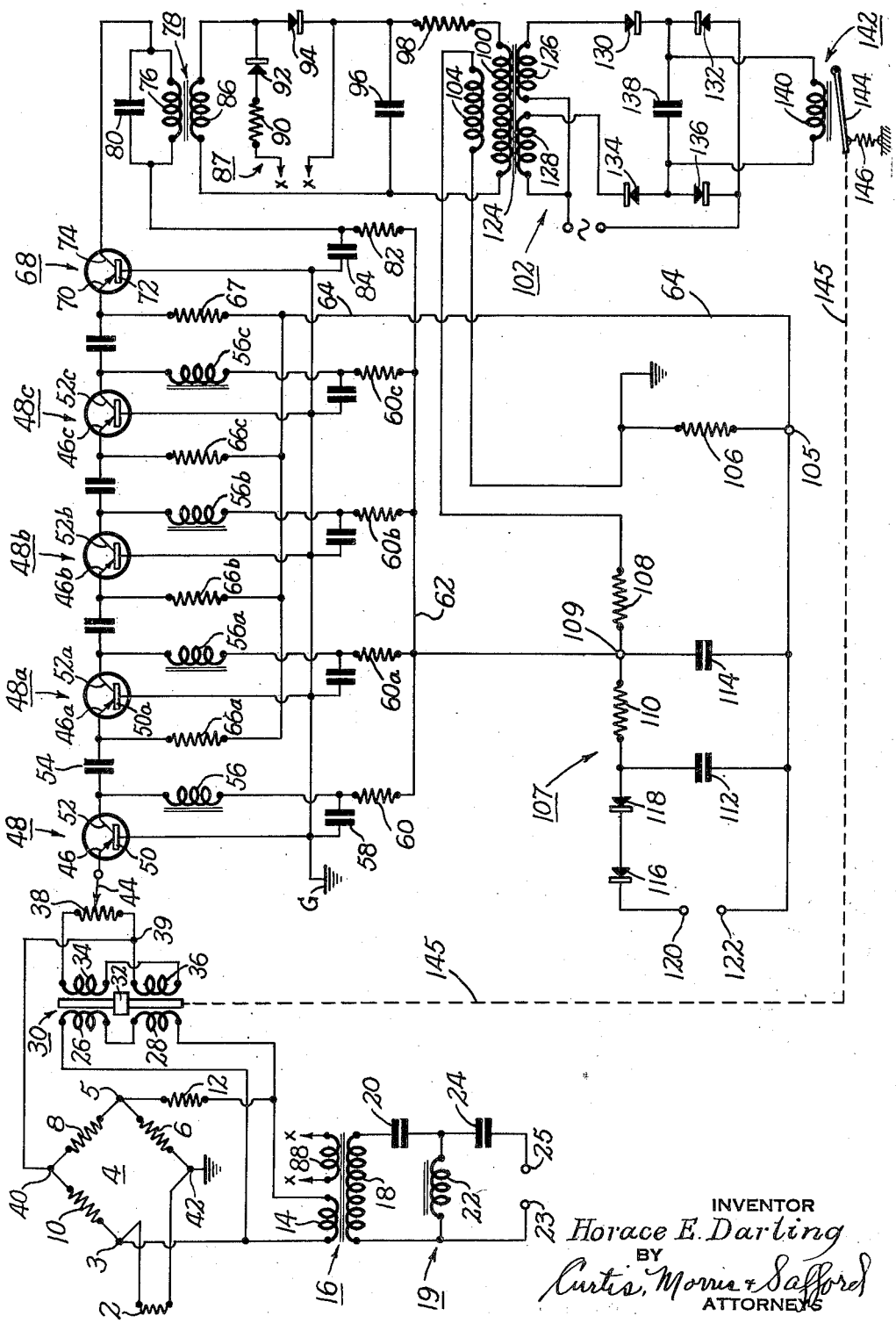
INVENTOR
*Horace E. Darling*
BY
*Curtis, Morris & Safford*
ATTORNEYS

United States Patent Office 2,830,242
Patented Apr. 8, 1958

2,830,242

SERVO SYSTEM MEASURING APPARATUS

Horace E. Darling, North Attleboro, Mass., assignor to The Foxboro Company, Foxboro, Mass.

Application January 6, 1955, Serial No. 480,145

11 Claims. (Cl. 318—22)

This invention relates to measuring apparatus, and more particularly to apparatus useful for measuring, recording, or controlling condition variations that are representable as changes in electrical resistance.

One principal application of such apparatus is in the field of temperature measurement and control. For example, a resistor element may be placed in a region of unknown temperature, and measurements of the ohmic resistance of this element will provide, because of the well-known relationship between the temperature and ohmic resistance of an electrical resistor element, an indication of the magnitude of, or variations in, the unknown temperature. Moreover, control equipment responsive to variations in the resistance so measured may be used to vary the amount of heat fed into this region so as to control the measured temperature, for example by maintaining the temperature at a constant predetermined magnitude.

While the ohmic resistance of a resistor element is a relatively precise function of its temperature, the magnitude of resistance variation is generally quite small. That is, a fairly large temperature change of, for example, several degrees Fahrenheit, will cause only a very slight percentage change in resistance. For precise measurement or control of temperature, therefore, it is necessary to provide resistance measuring equipment that is highly sensitive. Furthermore, such equipment should be sufficiently stable, rugged, and simple to be an economically useful tool in the many and varied commercial applications where resistance measuring apparatus is required.

One of the more common methods of determining resistance is to connect the unknown resistor to a source of electromotive force of known magnitude and measure the resulting current, for example, by a suitable meter. However, this method gives measurement results of only nominal accuracy, and in addition, the passage of current through the resistor of sufficient magnitude for measurement purposes may create substantial heat and thereby introduce a temperature error in the measurement.

An alternative to the above method is the use of a Wheatstone bridge, which commonly comprises a balanceable network of known resistors in combination with the resistor whose ohmic resistance is to be determined. By providing electrical energy to such a bridge, and by varying one of the known resistors until a "null output" has been obtained, the value of the unknown resistor can readily be determined by well known procedures. Such an arrangement effectively converts the unknown resistance variations into low-power electrical variations which can subsequently be amplified and then detected at a relatively high energy level, thus permitting the null adjustment to be made with considerable precision.

The Wheatstone bridge is generally capable of providing substantially greater accuracy than the direct resistance measurement method described above. And by combining such a bridge network with a closed-loop feedback system wherein the amplified bridge output is used to vary one or more of the known bridge resistors, for example by mechanically driving a slide wire potentiometer, so as to produce a balanced condition (i. e. a null output), the resulting physical drive motion can be used to operate automatically a recording device, or a control mechanism controlling the flow of heat into the region whose temperature is being measured. Systems broadly embodying these principles have been in use for some time and have proven to be commercially successful in certain applications.

One of the long-standing problems with such balanced-bridge systems has been the difficulty of driving the adjustable resistor precisely to the set point which produces a balanced null output condition. The precision with which the adjustable resistor can be set is, of course, one of the fundamental limitations determining the overall system accuracy. For example, the resistance of an ordinary wire wound potentiometer can be varied only in discrete steps, the magnitude of each step being dependent upon the resistance in each turn of the coil, and thus this type of potentiometer can provide an accuracy no better than the magnitude of the steps. A slide wire resistor, on the other hand, is also limited in accuracy, for example by the frictional resistance between the contact element and the wire; this friction often makes precise setting of the element very difficult if not impossible.

Many different mechanical arrangements have been proposed in the past for avoiding or minimizing contact discontinuities or steps, and yet providing a relatively wide range of resistance variation, such as for example a slide-wire resistor wound in the form of a helix. Other arrangements have been directed to minimizing contact friction and stickiness. Even with the intricate mechanisms developed, however, many applications require greater precision than is now available.

Another of the problems with resistance measuring systems of the type described hereinabove has been their general reliability. In order to achieve the accuracies now available, designers have continually increased the complexity of the equipment, for example by adding to the electronic amplification of the bridge output signal. Thus the measurement accuracy of these systems has become greatly dependent upon the hazards of tube aging, shock and vibration, and other adverse environmental conditions, and maintenance expenses and equipment breakdowns have increased considerably.

A preferred embodiment of the invention described herein provides an improved solution to these and related problems by means of a novel bridge arrangement and a simplified amplification and feed-back system. In this embodiment, the alternating output signal of a Wheatstone bridge, formed of fixed low-resistance resistors and including as one of its elements the unknown resistor, is connected in series with the alternating output signal of a magnetic device commonly referred to as a "differential transformer," i. e. a device whose output signal is controllable in accordance with the positioning of a small movable member associated therewith. The combined output signals are intensified by a multi-stage transistor amplifier and detected in a phase-sensitive rectifier to produce a direct-current signal used to energize a magnetic motor which, through a feedback linkage, controls the positioning of the movable member of the differential transformer.

When the resistance of the unknown resistor changes, the balance of the Wheatstone bridge will be altered, and the signal fed to the amplifier will correspondingly tend to change. The resulting movement of the magnetic motor will, however, reset the differential transformer through the feedback linkage in such a way as to maintain the combined signal fed to the amplifier at a nearly constant value. The extent of feedback linkage motion will be a measure of the change in resistance of the unknown resistor, and can be used to drive a recorder, controller, etc., in the usual way.

Accordingly, it is an object of this invention to provide automatic resistance measuring apparatus that is highly precise yet simple, durable, and reliable in operation. Other objects, aspects and advantages will be in part pointed out in, and in part apparent from, the following description considered together with the accompanying drawing which is a schematic diagram of one embodiment of the invention.

Referring now to the upper left hand corner of the drawing, a temperature-sensitive element 2 such as a resistance bulb is connected as one arm of a four element Wheatstone bridge, generally indicated at 4, and having three fixed resistances 6, 8, and 10 connected as the other three arms. The resistance bulb or temperature-sensitive element 2 can be any one of a variety of types well known in the art as suitable for making temperature measurements, and will normally be surrounded by or in contact with a medium whose temperature is to be determined.

To energize the bridge network 4, two opposite terminals 3 and 5 of this bridge are connected through a current-limiting resistor 12 to the output winding 14 of a power transformer 16. The input winding 18 of this transformer is connected to a magnetic harmonic generator, generally indicated at 19, and which includes a resonating capacitor 20, a saturable reactor 22, a tuning capacitor 24, and two input terminals 23 and 25 which are connected to a source of electrical energy (i. e., the usual 60 cycle, 110 volt power mains). This magnetic harmonic generator 19 converts the electrical energy obtained from the power mains into an alternating signal having a frequency that is an odd harmonic of the power main frequency, and feeds this signal to the input winding 18 of the power transformer 16. The purpose of converting to a higher frequency is to permit further simplification of the amplifier stages in other portions of the equipment, as will be explained hereinbelow. In the preferred embodiment the seventh harmonic of the power main frequency is used, so that the signal impressed on the transformer input winding 18 has a nominal frequency of 420 cycles per second.

The magnetic harmonic converter 19 operates generally as follows: A sinusoidal current wave is supplied by the power mains through the input terminals 23 and 25 to the tuning capacitor 24 and the saturable inductor 22. These latter elements together provide a series circuit tuned to resonance at the power main frequency, generally 60 cycles per second. Moreover, these elements are selected so that the current magnitude is sufficient to saturate the core of the inductor 22 during most of the cycle (i. e., the internal magnetic flux in the core remains at a fixed value over most of the power main cycle). Therefore, the saturable inductor 22, during this saturated portion of the cycle, presents a relative low impedance to and effectively short-circuits the series circuit comprised of the resonating capacitor 20 and the transformer input winding 18.

During the portion of the cycle when the current through the saturable inductor 22 approaches zero, the core material thereof becomes unsaturated, so that the inductance value suddenly increases and causes the inductor 22 to appear, for a short time, as a relatively high impedance. While the inductance value is relatively high, the resonating capacitor 20 is no longer short-circuited, and consequently a small charging current passes through the transformer input winding 18 and into the capacitor 20. This capacitor 20 continues to charge until the current through the inductor 22 has passed through zero and has increased in the opposite direction to a magnitude such that the inductor core material again becomes saturated. At this point, the inductor 22 suddenly presents, again, a very low impedance and the resonating capacitor 20 consequently discharges through the series circuit comprising inductor 22 and the output winding 18. When the current through the inductor 22, due to the 60 cycle power signal, again approaches zero during the succeeding portion of the cycle, the charging operation described hereinabove repeats, except that this time the resonating capacitor 20 charges in a reverse polarity sense.

The value of the resonating capacitor 20 is such that it, together with the saturable inductor 22 and the input winding 18, provides a circuit resonant to the desired odd harmonic (in the preferred embodiment, the seventh harmonic) of the power main frequency. Therefore, when the resonating capacitor 20 discharges, the effect is that of shock excitation of a tuned circuit, and the electrical energy initially stored in the resonating capacitor 22 during the charging cycle oscillates between this capacitor and the saturable inductor 22 at the desired frequency of 420 cycles per second. The oscillation currents thereby set up through the input winding 18 produce a corresponding voltage on the output winding 14 of the transformer 16. Each half cycle of the 60 cycle power main signal serves to replenish the shock excitation energy so that a continuous signal at the higher frequency is produced.

Returning now to the control circuitry, the output winding 14 of the power transformer 16 is also connected to the series combination of two input windings 26 and 28 of an inductive balance device (often referred to as a differential transformer) generally indicated at 30. This device is constructed so as to provide two flux paths having a portion thereof in common, an air gap in the common portion, and a movable element 32 located in the air gap such that its position controls the relative magnitude of flux passing through the two paths. The two output windings 34 and 36 of the differential transformer 30 are connected in series opposition, across the resistive element of a potentiometer 38, so that there is effectively no voltage applied to the potentiometer 38 when the position of the movable element 32 provides for balance of the induced flux in each of the two above-mentioned flux paths. Movement of the element 32 from the balanced position produces across the potentiometer 38 an output voltage having a magnitude substantially linearly related to the extent of such physical movement, and this voltage is either in phase or 180 degrees out of phase with the voltage on the input windings 26 and 28, depending upon the direction of this movement. For detailed information on differential transformers of this general character, see Patent No. 2,631,272, issued to Graydon Smith and dated March 10, 1953.

The output signals from the differential transformer 30 and the Wheatstone bridge 4 are combined in series by means of a connection from the lower terminal 39 of the potentiometer 38 to the upper output terminal 40 of the Wheatstone bridge 4; the lower output terminal 42 of the bridge is returned to a common system ground. The movable arm 44 of the potentiometer 38 provides an adjustment of the magnitude of the differential transformer output signal.

The combined output signals of the differential transformer 30 and the Wheatstone bridge 4 are coupled, by means of a connection between the movable arm 44 and the emitter electrode 46 of a transistor element 48, to the first stage of a multi-state transistor amplifier. The transistor element 48 also includes a semi-conducting body having a base electrode 50 and a collector electrode 52. The semi-conducting body may, for example, consist of crystalline germanium or silicon. The base electrode 50 of the transistor 48 is in low resistance or ohmic contact with the crystal and may be a large area electrode. The emitter and collector electrodes 46 and 52 are in rectifying contact with the crystal and may be point contacts or line contacts or they may have a comparatively large area of contact with the crystal.

The input signal on the emitter electrode 46 consists, as indicated hereinabove, of the series combination of the voltage between the output terminals 40 and 42 of the Wheatstone bridge and the voltage tapped from the output of the differential transformer 30 by the movable arm 44 of the potentiometer 38. Each of these voltages is of variable magnitude and may be either in-phase or out-of-phase with the 420 cycle signal on the output winding 14 of the power transformer 16. Any variation in electrical resistance of the resistance bulb 2 or change in position of the movable element 32 will alter this input signal, either as to its phase or magnitude or both, since such variation or change in position will produce a change in the balance of the Wheatstone bridge 4 or the differential transformer 30, respectively.

Transistors have, characteristically, a relatively low input impedance and a relatively high output impedance when connected as an amplifier. Since it is advantageous to feed a resistor from a source having a relatively low output impedance, this presents a special problem in adapting transistors for use with measuring instruments because these instruments typically employ high impedance bridge circuits and the like. This requirement is not nearly so stringent in the case of vacuum tubes which normally have a high input impedance. The apparatus disclosed herein provides a unique solution to this problem, since in the Wheatstone bridge 4 there are no adjustable resistors, such as those which typically have a relatively high ohmic resistance to afford reasonably precise setting, and thus all the bridge resistors may be chosen to have relatively low ohmic values (for example, approximately 100 ohms). Similarly, the differential transformer 30 is inherently a low impedance device, and additionally has bridged across its output circuit a potentiometer 38 which can readily have a low ohmic value since the movable arm 44 thereof has no requirement for precision setting, as will be obvious from the operation of the overall system set forth hereinbelow. Consequently, the transistor amplifier is energized by two circuits both of which are characterized by their low output impedance, thereby affording near-optimum impedance match and power transference to the amplifier circuits.

Another characteristic of transistors resides in their relatively high noise level. Normal coupling between sucessive stages of transistor amplifiers will permit amplification of this extraneous noise, with consequent jitter or fluctuations in the output signal. It has been found that this effect can be reduced materially by providing transformer coupling between each stage, and by tuning the transformer windings with shunt capacity to the frequency of the input signal.

Such transformer coupling provides a system having superior accuracy and stability. However, it has been found possible to obtain a remarkable improvement in gain of a multi-stage transistor amplifier, over the above tuned-transformer coupling arrangement, by coupling an anti-resonant circuit to the output terminals of each preceding transistor of a series of transistors, and by coupling the input terminals of the succeeding transistor in series with the resonant loop of this circuit.

Although the theory of this phenomenon has not yet been fully analyzed, one possible explanation is that a transistor, unlike a vacuum tube, is basically a current-sensitive device. Thus, since the internal circulating current in an anti-resonant circuit, particularly one with a relatively high Q, has a large magnitude compared to the current being fed into the anti-resonant circuit from the preceding amplification stage, the mode of coupling provides a large gain factor by itself. With such an arrangement, advantage is taken of the transistor's normally detrimental characteristic low input impedance, since this low impedance will not effectively lower the Q of the anti-resonant circuit and therefore the requisite sharp tuning of the amplifier will be retained.

Referring again to the drawing, a current return path for the input signal to the transistor amplifier is obtained by connecting the base electrode 50 of the transistor 48 to the common system ground. An anti-resonant circuit is formed in the output of this transistor by connecting to the collector electrode 52 one plate of a tuning capacitor 54 and one terminal of a load inductor 56. The other plate of the tuning capacitor 54 is connected to the emitter electrode 46a of the next succeeding transistor 48a, and the anti-resonant circuit is completed through the base electrode 50a of this transistor, the common system ground, and across a decoupling capacitor 58 back to the other terminal of the load inductor 56. This anti-resonant circuit is tuned to the frequency of the input signal which, in the preferred embodiment shown, is 420 cycles per second. The decoupling capacitor 58 has a large capacitance relative to the tuning capacitor 54, and hence has negligible effect on the tuning. And since, generally speaking, resonant circuit elements are more readily constructed and packaged at higher frequencies, one advantage of converting the 60 cycle power input to a 420 cycle signal source is clear.

Four similarly-connected stages of amplification are provided in the embodiment shown, and the similar elements of each are labelled with identical numerals and a differentiating letter suffix. The collector electrodes 52, 52a, 52b, 52c of each stage are provided, respectively, with negative direct-current potential through dropping resistors 60, 60a, 60b, 60c connected between the load inductors 56, 56a, 56b, 56c, and a high voltage lead 62 which in turn is connected to one terminal 109 of a rectifier power supply generally indicated at 107, and to be described hereinafter. Similarly, the emitter electrodes 46a, 46b, 46c are provided, respectively, with positive direct-current potential of relatively small magnitude through padding resistors 66a, 66b, 66c and a low voltage lead 64, which is connected to another terminal 105 of the rectifier power supply 107.

A final stage of amplification is provided in the form of a fifth transistor element 68. The emitter electrode 70 of this element is connected through a resistor 67 to the low-voltage lead 64, and is coupled to the preceding stage by an anti-resonant circuit arrangement such as previously described; the base electrode 72 is likewise grounded. Connected to the collector electrode 74 of this transistor 68, however, is the input winding 76 of a coupling transformer 78, and a shunt capacitor 80 is connected across this winding to tune the circuit to resonance at the signal frequency. The left hand terminal of the input winding 76 is connected through a dropping resistor 82 to a high voltage lead 62 to provide the collector electrode with the requisite direct-current potential, and a decoupling capacitor 84 is bridged between this latter terminal and the common system ground, in the usual manner, to by-pass fluctuating current.

Because the internal circulating current in an anti-resonant circuit lags the impressed voltage by approximately 90 electrical degrees, the anti-resonant coupling arrangement described hereinabove, when used between a cascaded series of transistor amplifier stages, causes a phase shift of about 90 degrees per stage. The first four stages, therefore, shift the input signal a total of 360 degrees, or back to the original phase orientation. The fifth stage, having a tuned transformer output circuit, shifts the phase an additional 180 degrees in the usual manner.

In order to convert the amplified alternating signal into a direct-current signal of proper magnitude and polarity, for purposes to be described hereinafter, an output winding 86 of the coupling transformer 78 is connected to synchronously-gated rectifier circuit, generally indicated at 87, which is arranged to pass current of one phase orientation, and to block the passage of current of opposite phase orientation. To energize this rectifier circuit, a phase-comparison signal is fed through terminals x—x from a reference winding 88 of the power transformer 16 (adjacent the left hand edge of the drawing), through a current-limiting resistor 90 and a comparison rectifier 92, and is coupled across a sensing rectifier 94 forming a part of this detector. A filter capacitor 96 is connected in series with this sensing rectifier 94 and with the output winding 86 of the coupling transformer 78. Connected in parallel with the filter capacitor 96 is a load consisting of a gain-adjusting resistor 98 and a control winding 100 of a magnetic amplifier 102.

Referring now to the operation of this synchronously-gated rectifier circuit, it can be seen that the sensing rectifier 94 is common to two closed circuits, the first of which includes the output winding 86, the filter capacitor 96 and the load; and the second of which includes the reference winding 88 of the power transformer 16, the current-limiting resistor 90 and the comparsion rectifier 92. If there is no signal being fed through the coupling transformer 78 and out of the output winding 26 thereof, the sensing rectifier 94 will be responsive only to the phase-comparison signal fed from the reference winding 88, and will pass current during the conducting half cycle of this signal. This current, however, will merely flow around the second of the above-mentioned closed circuits and thus will not flow through the load. Therefore, in this situation, there will be no output signal in the control winding 100 of the magnetic amplifier 102.

However, when an amplified signal is fed through the coupling transformer 78, and if it is in phase with the phase-comparison signal (i. e.—if both signals would tend to cause conduction through the sensing rectifier 94 at the same time), then the sensing rectifier 94 will pass unidirectional current from the coupling transformer output winding 86 to the load, and will build up an output voltage on the filter capacitor 96. On the other hand, if the amplified signal coupled through transformer 78 is of opposite phase relative to the phase-comparison signal coupled from the reference winding 88, the amplified signal, during its half wave of conducting polarity, will be opposed in its tendency to cause conduction through the sensing rectifier 94 by the opposite-polarity phase-comparison signal. That is, the sensing rectifier 94 will have impressed across its terminals two signals of opposite polarity, one tending to cause conduction, and the other tending to prevent conduction. Consequently, current will not pass through the sensing rectifier 94 if the phase-comparison signal has a larger magnitude than the amplified signal. By arranging the magnitude of the phase-comparison signal to be greater than any amplified signal to be coupled through the coupling transformer 78, it will be appreciated that this rectifier circuit serves the function of a synchronous switch, i. e. it will pass current of one phase but block current of the opposite phase.

When a signal of appropriate phase has been amplified and rectified, there will be a resulting unidirectional current flow through the control winding 100 of the magnetic amplifier 102. A balance winding 104 forming part of this magnetic amplifier 102 is connected to the common system ground and to one terminal of the rectifier power supply 107. The current passing through this winding 104 produces flux in the core 124 of the magnetic amplifier 102 which opposes the flux produced by the rectified signal current passing through the control winding 100, and thereby establishes the normal quiescent operating condition for the magnetic amplifier 102.

Referring now to the power supply 107, this portion of the system includes two input terminals 120 and 122 which are connected to the usual 60 cycle power mains. The alternating power signal is rectified by two rectifiers 116 and 118 which are connected in series, and which are preferably of the dry type. The rectified signal is smoothed by a pisection filter comprising two shunt capacitors 114 and 112, and a series resistor 110. The negative high voltage terminal 109 is connected to the output of this filter, and this terminal is also connected, through a dropping resistor 108 and the balance winding 104 (referred to hereinabove) to the system ground. One input terminal 122 is connected to the positive low voltage output terminal 105, and, through a small dropping resistor 106, to the system ground. This latter output terminal 105 provides a small direct-current potential (for example less than 1 volt), through the low voltage lead 64, for the transistor emitter electrodes.

Returning now to the control circuitry, the core 124 of the magnetic amplifier 102 is constructed of saturable magnetic material, so that the impedance of the two output windings 126 and 128 is dependent upon the magnitude of current passing through the control winding 100 and the balance winding 104. Each of the output windings 126 and 128 is connected in series with a source of 60 cycle power and one pair of rectifiers 130 and 132, 134 and 136, respectively, which are preferably of the dry type. A filter capacitor 138 and the winding 140 of a magnetic drive-motor 142 are connected between the common junctions of the above rectifier pairs.

This latter portion of the circuitry operates as a full-wave rectifier to pass current to the drive motor winding 140 in accordance with the magnitude of the impedances of the output windings 126 and 128. One current path may be traced from the 60 cycle power source through one output winding 126, one of the right hand rectifiers 130 (as shown in the drawing), the motor winding 140, one of the left hand rectifiers 136, and back to the 60 cycle power source. The other current path may be traced from the 60 cycle power source through the other right hand rectifier 132, the motor winding 140, the other left hand rectifier 134, the second output winding 128, and back to the 60 cycle power source. Thus, for example, as the impedance of the output windings 126 and 128 decreases, the current fed to the drive winding 140 increases, which in turn provides increased energization to the magnetic motor 142 which is adapted to move a feedback linkage 145.

The drive-motor 142 includes a movable armature 144 which is hingeably connected at one end, spring-loaded by a spring 146, and physically located so as to be in the magnetic flux path of the motor winding 140. The armature 144 is also linked mechanically (as shown by the broken line 145) to the movable element 32 of the differential transformer 30. When current flows through the motor winding 140, a torque is placed on the armature 144 which then moves against the tension of the spring 146 until the torque and the spring tension become balanced at a position of equilibrium.

The overall operation of the measuring system is generally as follows: Assume, for example, that the resistance of the bulb 2 is of such a magnitude as to create a balanced condition in the Wheatstone bridge 4, and that no current is flowing through the motor winding 140 of the drive-motor 142 (i. e. the motor armature 144, as well as the movable element 32, are at one extreme position of the range of movement). There will then be, initially, a large input voltage on the emitter electrode 46 of the first transistor 48 due to the off-null condition of the differential transformer 30. This voltage, at 420 cycles per second, is amplified by the tuned transistor amplifier and its phase is such that it will be rectified by the synchronously-gated rectifier circuit 87 and then amplified by the magnetic amplifier 102. The output of the magnetic amplifier 102 is detected in the above-described full-wave rectifier circuit, and the resulting current through the motor winding 140 of the drive motor 142 causes a displacement of its armature 144 and a corresponding traverse of the movable element 32 of the differential transformer 30 toward its null position. During this traverse, the output voltage of the differential transformer 30 will continually decrease, until a particular voltage is reached that is just sufficient to create enough feedback from the drive motor 142 and its mechanical linkage to maintain the movable element 32 in a position to provide that particular amount of output voltage.

In this stable condition, any variation in resistance of the bulb 2, such as due to a change in its temperature, will create a momentary unbalance voltage which will be amplified and rapidly reflected in a repositioning of the movable element 32 to keep the input voltage to the first transistor 48 virtually constant. The amount of repositioning required to rebalance the system is, then, a measure of the variation of the resistance of the bulb 2, and hence is a measure of the temperature deviation which brought about the change in resistance. The physical motion of the linkage between the armature 144 and the movable element 32 can, of course, be used to drive a recording pen, operate a temperature controller, etc. (not shown).

The synchronously-gated rectifier circuit 87 built around the sensing rectifier 94 provides an additional advantage in assuring that the system is not accidentally placed in a non-operating condition. If, for example, the armature 144 is placed against its stops (fully actuated) when the Wheatstone bridge 4 is balanced, the differential transformer 30 would put out a large signal of reverse phase (i. e. a signal which would not be passed by the synchronously-gated rectifier circuit 87). If, in this situation, the output of the coupling transformer 78 were rectified by a conventional detector, the resulting signal would tend to keep the drive motor 142 against its stops, since the direction of current flowing through the control winding 100 would be the same regardless of phase. Operation would thereby be prevented. By using, in effect, a synchronous switch, this out-of-phase signal is precluded from reaching the drive motor, which then quickly returns to its proper stable operating condition.

It can be seen, therefore, that the invention described herein meets the objectives as set forth above, by providing a stable, precise, and reliable resistance measuring system. No vacuum tubes need be used, either in producing an alternating current signal of frequency high enough for ready amplification, in converting the 60 cycle power to direct-current potentials, or in amplifying or detecting the unbalance signals. The devices which are used to perform the functions ordinarily served by vacuum tubes are physically small, durable, and have long life capabilities so as to reduce operating and maintenance costs. The problems inherent in the discontinuities and contact friction of adjustable resistors is avoided by the use of fixed resistors and a continuously variable, inductive balance device. And the amplification gain of the system is sufficiently high to provide remarkable accuracies; it being possible, for example, to insert losser elements (such as the gain-adjusting resistor 98) into the system for stability control purposes, without reducing the system accuracy measurably.

While there is given above a certain specific example of this invention and its application in practical use, it should be understood that this is not intended to be exhaustive or to be limiting of the invention. On the contrary, this illustration and the explanation herein is given in order to acquaint others skilled in the art with this invention and the principles thereof and a suitable manner of its application in practical use, so that others skilled in the art may be enabled to modify the invention and to adapt it and apply it in numerous forms, each as may be best suited to the requirement of a particular use.

Wht is claimed is:

1. In a resistance measuring system, the combination of a resistor of unknown ohmic resistance, a Wheatstone bridge including four resistance arms, one of said arms including said resistor, a differential transformer including a core of magnetic material substantially defining two flux paths each having a portion thereof in common, input and output windings for said differential transformer, an air gap located in the common portion of said flux paths, a movable element positioned in said air gap and operable to control the relative magnitudes of flux in said two flux paths, a source of alternating current connected to said Wheatstone bridge and said input windings, said source comprising a magnetic harmonic converter having a saturable core reactor in combination with at least two capacitors, a tuned multi-stage transistor amplifier coupled to said differential transformer output windings and including inter-stage coupling comprising at least one anti-resonant circuit, motor drive means connected to the output of said amplifier, and mechanical feed-back means linking the output of said motor drive means to said movable element whereby variations in the output of said Wheatstone bride are automatically and substantially balanced by corresponding variations in the output of said differential transformer.

2. In a resistance measuring system, the combination of a resistor of unknown ohmic resistance, a Wheatstone bridge including four resistance arms, one of said arms including said resistor, a differential transformer including a core of magnetic material substantially defining two flux paths each having a portion thereof in common, input and output windings for said differential transformer, an air gap located in the common portion of said flux paths, a movable element positioned in said air gap and operable to control the relative magnitudes of flux in said two flux paths, a source of alternating current connected to said Wheatstone bridge and said input windings, said source comprising a magnetic harmonic converter having a saturable core reactor in combination with at least two capacitors, a tuned transistor amplifier coupled to said differential transformer output windings and including a plurality of transistors, interstage coupling for said transistors comprising at least one anti-resonant circuit, motor drive means connected to the output of said amplifier, and mechanical feed-back means linking the output of said motor drive means to said movable element whereby variations in the output of said Wheatstone bridge are automatically and substantially balanced by corresponding variations in the output of said differential transformer.

3. In a resistance measuring system, the combination of a fixed sensing resistor of unknown ohmic resistance, said resistor being temperature-sensitive such that the resistance thereof varies with changes in the surrounding ambient temperature, a Wheatstone bridge including four resistance arms, one of said arms including said sensing resistor, the other of said arms comprising fixed resistors of relatively low ohmic resistance, an input and an output circuit for said Wheatstone bridge, a differential-transformer including a core of magnetic material substantially defining two flux paths each having a portion thereof in common, an input and an output circuit for said differential-transformer, an air-gap located in the common portion of said two flux paths, a methanically movable element positioned in said air-gap and operable to control the relative magnitudes of flux in said two flux paths in accordance with the positioning thereof relative to said air-gap, a source of alternating current including a saturable-core reactor connected to the input circuits of said Wheatstone bridge and said differential-transformer, first circuit means for connecting said bridge output circuit in series with said differential-transformer output circuit, a tuned multi-stage transistor amplifier, interstage coupling for said amplifier including anti-resonant circuit means, an input and an output circuit for said amplifier, second circuit means for coupling said amplifier input circuit to the series combination of said bridge output circuit and said differential-transformer output circuit, motor drive means connected to the output circuit of said amplifier and energized thereby, and mechanical feedback means connected to said motor drive means for linking said motor drive means to said movable element in such a manner that variations in the output of said Wheatstone bridge due to changes in the resistance of said fixed sensing resistor are automatically and substantially balanced by corresponding variations in the output of said differential transformer so as to maintain the voltage fed to said amplifier input circuit at a substantially constant level.

4. In a resistance measuring system, the combination of a fixed sensing resistor of unknown ohmic resistance, said resistor being temperature-sensitive such that the resistance thereof varies with changes in the surrounding ambient temperature, a Wheatstone bridge including four resistance arms, one of said arms including said sensing resistor, the other of said arms comprising fixed resistors of relatively low ohmic resistance, an input and an output circuit for said Wheatstone bridge, a differential-transformer including a pair of windings coupled together by a magnetic circuit adapted to carry magnetic flux, an input and an output circuit for said differential transformer, a mechanically movable element for said differential-transformer and positioned within said magnetic circuit, said element being operable to control the extent of magnetic flux coupling between said windings in accordance with the positioning thereof relative to said magnetic circuit, a source of alternating current connected to the input circuits of said Wheatstone bridge and said differential-transformer, first circuit means for connecting said bridge output circuit in series with said differential-transformer output circuit, a multi-stage transistor amplifier having an input and an output circuit, second circuit means for coupling said amplifier input circuit to the series combination of said bridge output circuit and said differential-transformer output circuit, motor drive means connected to the output circuit of said amplifier and energized thereby, and mechanical feedback means connected to said motor drive means for linking said motor drive means to said movable element in such a manner that variations in the output of said Wheatstone bridge due to changes in the resistance of, said fixed sensing resistor are automatically and substantially balanced by corresponding variations in the output of said differential-transformer so as to maintain the voltage fed to said amplifier input circuit at a substantially constant level.

5. In a resistance measuring system, the combination of a fixed sensing resistor of unknown ohmic resistance, said resistor being temperature-sensitive such that the resistance thereof varies with changes in the surrounding ambient temperature, a Wheatstone bridge including four resistance arms, one of said arms including said sensing resistor, the other of said arms comprising fixed resistors of relatively low ohmic resistance, an input and an output circuit for said Wheatstone bridge, a differential-transformer including input and output windings coupled together by a magnetic circuit linking both of said windings by magnetic flux passing therethrough, an input and an output circuit for said differential-transformer, a mechanically movable element disposed in said magnetic circuit and operable to control the extent of flux linkage between said windings in accordance with the positioning thereof relative to said magnetic circuit, a source of alternating current connected to the input circuits of said Wheatstone bridge and said differential-transformer, first circuit means for connecting said bridge output circuit in series with said differential-transformer output circuit, an amplifier including an input and an output circuit, second circuit means for coupling said amplifier input circuit to the series combination of said bridge output circuit and said differential-transformer output circuit, motor drive means connected to the output circuit of said amplifier and energized thereby, and mechanical feed-back means connected to said motor drive means for linking said motor drive means to said movable element in such a manner that variations in the output of said Wheatstone bridge due to changes in the resistance of said fixed sensing resistor are automatically and substantially balanced by corresponding variations in the output of said differential transformer so as to maintain the voltage fed to said amplifier input circuit at a substantially constant level.

6. In a resistance measuring system, the combination of a fixed sensing resistor of unknown ohmic resistance, said resistor being temperature-sensitive such that the resistance thereof varies with changes in the surrounding ambient temperature, a Wheatstone bridge including four resistance arms, one of said arms including said sensing resistor, the other of said arms comprising fixed resistors of relatively low ohmic resistance, an input and an output circuit for said Wheatstone bridge, a differential-transformer including input and output windings coupled together by a magnetic circuit linking both of said windings by magnetic flux passing therethrough, an input and an output circuit for said differential-transformer, a mechanically movable element disposed in said magnetic circuit and operable to control the extent of flux linkage between said windings in accordance with the positioning thereof relative to said magnetic circuit, a source of alternating current connected to the input circuits of said Wheatstone bridge and said differential-transformer, first circuit means for connecting said bridge output circuit in series with said differential-transformer output circuit, an amplifier including an input and an output circuit, second circuit means for coupling said amplifier input circuit to the series combination of said bridge output circuit and said differential-transformer output circuit, motor drive means connected to the output circuit of said amplifier and energized thereby, said motor including a movable output member subjected to a motor force in accordance with the magnitude of the output of said amplifier, spring means connected to said member to produce a force thereon in opposition to said motor force, whereby said member takes a position determined by the output of said amplifier, and mechanical feed-back means connected to said motor drive means for linking said member to said movable element in such a manner that variations in the output of said Wheatstone bridge due to changes in the resistance of said fixed sensing resistor are automatically and substantially balanced by corresponding variations in the output of said differential transformer, so as to maintain the voltage fed to said amplifier input circuit at a substantially constant level.

7. In a resistance measuring system, the combination of a fixed sensing resistor of unknown ohmic resistance, said resistor being temperature-sensitive such that the resistance thereof varies with changes in the surrounding ambient temperature, a Wheatstone bridge including four resistance arms, one of said arms including said sensing resistor, the other of said arms comprising fixed resistors of relatively low ohmic resistance, an input and an output circuit for said Wheatstone bridge, a differential-transformer including input and output windings coupled together by a magnetic circuit linking both of said windings by magnetic flux passing therethrough, an input and an output circuit for said differential-transformer, a mechanically movable element disposed in said magnetic circuit and operable to control the extent of flux linkage between said windings in accordance with the positioning thereof relative to said magnetic circuit, a source of alternating current connected to the input circuits of said Wheatstone bridge and said differential-transformer, first circuit means for connecting said bridge output circuit in series with said differential-transformer output circuit, an amplifier including an input and an output circuit, second circuit means for coupling said amplifier input circuit to the series combination of said bridge output circuit and said differential-transformer output circuit, synchronously-gated rectifier means coupled to the output circuit of said amplifier and adapted to pass signals of one phase orientation and to block the passage of signals of opposite phase orientation, motor drive means coupled to the output of said synchronously-gated rectifier means, and mechanical feed-back means connected to said motor drive means for linking said motor drive means to said movable element in such a manner that variations in the output of said Wheatstone bridge due to changes in the resistance of said fixed sensing resistor are automatically and substantially balanced by corresponding variations in the output of said differential transformer so as to maintain the voltage fed to said amplifier input circuit at a substantially constant level.

8. In a resistance measuring system, the combination of a fixed sensing resistor of unknown ohmic resistance, said resistor being temperature-sensitive such that the resistance thereof varies with changes in the surrounding ambient temperature, a Wheatstone bridge including four resistance arms, one of said arms including said sensing resistor, the other of said arms comprising fixed resistors of relatively low ohmic resistance, an input and an output circuit for said Wheatstone bridge, a differential-transformer including input and output windings coupled together by a magnetic circuit linking both of said windings by magnetic flux passing therethrough, an input and an output circuit for said differential-transformer, a mechanically movable element disposed in said magnetic circuit and arranged to control the magnitude and phase orientation of the net flux linkages between said windings in accordance with the physical positioning thereof relative to said magnetic circuit, a source of alternating current connected to the input circuits of said Wheatstone bridge and said differential-transformer, said output circuits being energized thereby to produce alternating-current signals the magnitudes and phase orientation of which are determined respectively by the ohmic resistance of said sensing resistor and the positioning of said movable element, first circuit means for connecting said bridge output circuit in series with said differential-transformer output circuit, a transistor amplifier including an input and an output circuit, second circuit means for coupling said amplifier input circuit to the series combination of said bridge output circuit and said differential-transformer output circuit, synchronously-gated rectifier means coupled to the output circuit of said transistor amplifier, third circuit means coupling said source of alternating current to said synchronously-gated rectifier means to provide a comparison signal therefor, said rectifier means being arranged to produce a control signal in accordance with the magnitude of the output of said amplifier means when said amplifier output is of a predetermined phase orientation and also being arranged to produce effectively no control signal when said amplifier output is of opposite phase orientation to said predetermined phase orientation, motor drive means coupled to said synchronously-gated rectifier means and energized in accordance with the magnitude of the control signal produced thereby, and mechanical feed-back means connected to said motor drive means for linking said motor drive means to said movable element in such a manner that variations in the output of said Wheatstone bridge due to changes in the resistance of said fixed sensing resistor are automatically and substantially balanced by corresponding variations in the output of said differential transformer so as to maintain the voltage fed to said amplifier input circuit at a substantially constant level.

9. In a resistance measuring system, the combination of a fixed sensing resistor of unknown ohmic resistance, said resistor being temperature-sensitive such that the resistance thereof varies with changes in the surrounding ambient temperature, a Wheatstone bridge including four resistance arms, one of said arms including said sensing resistor, the other of said arms comprising fixed resistors of relatively low ohmic resistance, an input and an output circuit for said Wheatstone bridge, a differential-transformer including input and output windings coupled together by a magnetic circuit linking both of said windings by magnetic flux passing therethrough, an input and an output circuit for said differential-transformer, a mechanically movable element disposed in said magnetic circuit and operable to control the extent of flux linkage between said windings in accordance with the positioning thereof relative to said magnetic circuit, a source of alternating current connected to the input circuits of said Wheatstone bridge and said differential-transformer, first circuit means for connecting said bridge output circuit in series with said differential-transformer output circuit, an amplifier including an input and an output circuit, second circuit means for coupling said amplifier input circuit to the series combination of said bridge output circuit and said differential-transformer output circuit, synchronously-gated rectifier means coupled to the output of said amplifier means, said rectifier means including a first half-wave rectifier and a load circuit connected in series with the output of said amplifier, a comparison-signal circuit connected across said first half-wave rectifier, and energized by said source of alternating current, said comparison-signal circuit including a second half-wave rectifier connected in series between said source and said first half-wave rectifier, motor drive means coupled to the load circuit of said synchronously-gated rectifier means, and mechanical feed-back means connected to said motor drive means for linking said motor drive means to said movable element in such a manner that variations in the output of said Wheatstone bridge due to changes in the resistance of said fixed sensing resistor are automatically and substantially balanced by corresponding variations in the output of said differential transformer so as to maintain the voltage fed to said amplifier input circuit at a substantially constant level.

10. In a measuring system, the combination of a sensing network including a condition-responsive member, an input and an output circuit for said network, a differential-transformer including input and output windings coupled together by a magnetic circuit linking both of said windings by magnetic flux passing therethrough, an input and an output circuit for said differential-transformer, a mechanically movable element disposed in said magnetic circuit and operable to control the extent of flux linkage between said windings in accordance with the positioning thereof relative to said magnetic circuit, a source of alternating current connected to the input circuits of said sensing network and said differential-transformer, first circuit means for connecting said sensing network output circuit in series with said differential-transformer output circuit, an amplifier including an input and an output circuit, second circuit means for coupling said amplifier input circuit to the series combination of said sensing network output circuit and said differential-transformer output circuit, synchronously-gated rectifier means coupled to the output of said amplifier means, said rectifier means including a first half-wave rectifier and a load circuit connected in series with the output of said amplifier, a comparison-signal circuit connected across said first half-wave rectifier and energized by said source of alternating current, said comparison-signal circuit including a second half-wave rectifier connected in series between said source and said first half-wave rectifier, motor drive means coupled to the load circuit of said synchronously-gated rectifier means, and mechanical feed-back means connected to said motor drive means for linking said motor drive means to said movable element in such a manner that variations in the output of said sensing network due to changes in said condition-responsive member are automatically and substantially balanced by corresponding variations in the output of said differential transformer so as to maintain the voltage fed to said amplifier input circuit at a substantially constant level.

11. In a measuring system, the combination of sensing means including a condition-responsive member, an input and an output circuit for said sensing means, a variable-voltage device including an input and an output circuit, a mechanically-movable element forming part of said device and operable to control the magnitude and phase of the output voltage thereof, a source of alternating current connected to the input circuits of said sensing means and said variable-voltage device, first circuit means for connecting said sensing means output circuit in series with said variable-voltage device output circuit, an amplifier including an input and an output circuit, second circuit means for coupling said amplifier input circuit to the series combination of said sensing means output circuit and said variable-voltage device output circuit, synchronously-gated rectifier means coupled to the output of said amplifier and arranged to pass signals of one phase orientation and to block the passage of signals of opposite phase orientation, motor drive means coupled to said synchronously-gated rectifier means and operable in accordance with the output thereof, and mechanical feed-back means connected to said motor drive means for linking said motor drive means to said movable element in such a manner that variations in the output of said sensing means due to changes in said condition-responsive member are automatically and substantially balanced by corresponding variations in the output of said variable-voltage device so as to maintain the voltage fed to said amplifier input circuit at a substantially constant level.

References Cited in the file of this patent

UNITED STATES PATENTS

| | | |
|---|---|---|
| 2,557,224 | Hornfeck | June 19, 1951 |
| 2,612,628 | Hornfeck | Sept. 30, 1952 |
| 2,615,936 | Glass | Oct. 28, 1952 |
| 2,647,957 | Mallinckrodt | Aug. 4, 1953 |
| 2,652,460 | Wallace | Sept. 15, 1953 |
| 2,653,282 | Darling | Sept. 22, 1953 |
| 2,681,391 | Bradley | June 15, 1954 |
| 2,691,074 | Eberhard | Oct. 5, 1954 |
| 2,729,708 | Goodrich | Jan. 3, 1956 |

OTHER REFERENCES

"The Transistor," pp. 357, 375, 376, a text pub. 1951 by Bell Tel. Labs. Inc.